United States Patent [19]

Terada et al.

[11] Patent Number: 4,637,937

[45] Date of Patent: Jan. 20, 1987

[54] PROCESS FOR MAKING CREAMY BACTERIA-FREE FOAMABLE OIL-IN-WATER EMULSION INCLUDING CHOCOLATE

[75] Inventors: Kimio Terada; Michio Mori; Yoichi Goto; Takashi Nakazawa; Kunio Muto; Shozo Usami, all of Tokyo, Japan

[73] Assignee: Asahi Denka Kogyo Kabushiki Kaisha, Tokyo, Japan

[21] Appl. No.: 633,242

[22] Filed: Jul. 23, 1984

[51] Int. Cl.$^4$ .......................... A23D 5/02; A23G 1/00
[52] U.S. Cl. .................................. 426/570; 426/572; 426/584; 426/602; 426/593; 426/613
[58] Field of Search ............... 426/593, 613, 602, 570, 426/564, 584, 572

[56] References Cited

U.S. PATENT DOCUMENTS

| | | | |
|---|---|---|---|
| 2,833,286 | 4/1959 | Musser | 426/570 |
| 3,353,965 | 11/1967 | Patterson | 426/570 |
| 3,840,682 | 10/1974 | Kubota et al. | 426/602 X |
| 3,903,310 | 9/1975 | Buide et al. | 426/602 X |
| 4,107,343 | 8/1978 | Petricca | 426/564 |
| 4,343,818 | 8/1982 | Eggen | 426/593 X |
| 4,396,638 | 8/1983 | Edo et al. | 426/602 X |
| 4,438,147 | 3/1984 | Hedrick, Jr. | 426/593 X |
| 4,461,777 | 7/1984 | Murase et al. | 426/602 X |

FOREIGN PATENT DOCUMENTS

| | | | |
|---|---|---|---|
| 655176 | 1/1963 | Canada | 426/613 |
| 0129944 | 8/1983 | Japan | 426/602 |

*Primary Examiner*—Robert Yoncoskie
*Attorney, Agent, or Firm*—Birch, Stewart, Kolasch & Birch

[57] ABSTRACT

A bacteria-free foamable oil-in-water emulsion including chocolate is prepared by forming an emulsion containing (1) 5–35 wt % of oil, (2) 3–30 wt % of chocolate component, (3) 10–30 wt % of sugar component, (4) 0.5–4 wt % of sodium caseinate, (5) 0.02–0.1 wt % of phosphoric acid salt, (6) 0.05–3 wt % of stabilizer, (7) 2–6 wt % of defatted milk solid, (8) 3–10 wt % of emulsifier based on the oil and (9) 40–60 wt % of all solid components in the emulsion and by sterilizing the said emulsion by heating at ultra high temperature. The bacteria-free foamable oil-in-water emulsion including chocolate has long time stability and high foamability, and it meets the current demand for baking or confectionary products having softness and wetness.

19 Claims, No Drawings

PROCESS FOR MAKING CREAMY BACTERIA-FREE FOAMABLE OIL-IN-WATER EMULSION INCLUDING CHOCOLATE

BACKGROUND OF THE INVENTION (1) Field of the Invention

The present invention relates a process for making creamy bacteria-free foamable oil-in-water emulsion including chocolate, which has long time stability and high foamability, and which meets the current demand for baking or confectionary products having softness and wetness.

(2) Description of the Prior Art

There are many sorts of chocolate-including food products which comprise chocolate, raw cream, milk, nuts, and sugar, such as Ganache, Gianduya, Pralinen, etc.

Ganache is a mixture of chocolate and cream and/or milk. Generally it is prepared by adding boiled cream or milk to melted chocolate, mixing them well, and leaving the mixture in a cooling room for 24 hours before use. Ganache is mainly used by painting or squeezing. It is possible to control Ganache softness by changing the ratio of chocolate.

Gianduya is a paste which is prepared by kneading a ground mixture of equivalent amount (by weight) of nuts and sugar with chocolate, cocoa, and butter. Gianduya is used for coating on cakes, filling of chocolate cakes, and filling of cakes with butter cream.

Pralinen is a type of sugar.

It is obvious that chocolate has a wide variety of fields of application and an important role as a cake material.

As mentioned above, the softness of Ganache is controlled by the chocolate ratio. It is remarkable that such control is now very popular. Recently there is a demand for confectionary products having softness and wetness. The tendency is the same with Ganache. Therefore, recent Ganache products have become softer and wetter by controlling the aqueous phase to increase the contents of milk.

In view of the situation, the inventors of the present invention studied Ganache and found following problems.

Firstly, while chocolate itself has long stability for including little water and much sugar, Ganache including cream and milk has low stability on account of a high-content of water and dairy products and low-level of sugar. This is because $10^2$–$10^3$/g of bacteria exist in chocolate and cacao mass.

Secondly, it is difficult to consistently obtain a Ganache having desired softness by controlling the chocolate ratio.

The third problem is that foamability of cream is lost when chocolate is mixed with boiled cream. Very soft Ganache is sometimes able to be whipped, but this is not for foamability of cream but for airation of mixing. Therefore, Ganache never has a whip cream-milk foamability.

Furthermore, a layer of whipped Ganache is easy to crack in the course of time. In an attempt to avoid the undesirable effect of cracks, particularly in large fancy cakes, it has been common to sprinkle out shaved chocolate over the surface of the cakes in order to prevent a purchaser's reduced desire for a product with cracks.

SUMMARY OF THE INVENTION

The inventors of the present invention seriously recognized the aforenoted problems, especially the cracking problem that is a very significant restriction for using chocolate in the field of confectionary, studied to solve these problems, and accomplished the invention.

The process for making a creamy bacteria-free foamable oil-in-water emulsion of the present invention comprises;
(a) forming an oil-in-water emulsion containing
   (1) 15–35 wt% of oil
   (2) 3–30 wt% of chocolate component
   (3) 10–30 wt% of sugar component
   (4) 0.5–4 wt% of sodium caseinate
   (5) 0.02–0.1 wt% of phosphoric acid salt
   (6) 0.05–3 wt% of stabilizer
   (7) 2–6 wt% of defatted milk solid
   (8) 3–10 wt% of emulsifier based on the oil
   (9) 40–60 wt% of all solid components in the emulsion
(b) sterilizing the said emulsion by heating at ultra high temperature.

DETAILED DESCRIPTION OF THE INVENTION

For the a oil of the present invention, it is preferable to use the mixed oil of lauric acid type oil having 30°–38° C. rising melting point and non lauric type oil. The mixed oil preferably comprises at least 20 wt% (more preferably 40 wt%) of lauric acid type oil. Using such preferable oil gives (a) good emulsion products having good foamability and durability qualities.

As the lauric acid type oil that has 30°–38° C. rising melting point, there are, for example, coconut oil, palm kernel oil, and their hardened oil, their fractionated oil, their ester-exchanged oil.

As the non lauric acid type oil, there are represented animal oil, vegetable oil, their hardened oil, their mixed oil or their various processed oil. Such non lauric acid type oil preferably has 20–55 SFI at 10° C. and 25°–40° C. rising melting point (Wiley melting point). Examples of the non lauric acid type oil are fish oil, whale oil, rape seed oil, their hardened oil, their fractionated oil, their ester-exchanged oil.

It is particularly preferred in the present invention to use the mixed oil including 5–30 wt% of a saturated or a unsaturated fatty acid (including higher unsaturated fatty acid) that has more than 20 carbon atoms in the entire structured fatty acid. On the cakes using emulsion products of above defined oil, no cracks occur in the course of time.

The content of the oil is 15–35 wt% in the whole emultion of the present invention. If the content is below 15 wt%, durability becomes weak, and if the content is over 35 wt%, the emulsion solidifies like brick and becomes unfoamable, thereby losing practical utility.

It is possible to select as the need of the demand one or a combination of chocolate components such as cacao butter, cacao mass, cacao powder, sweet chocolate, milk chocolate, cover chocolate, enzyme (amylase) treated chocolate to create desired flavor and taste. It is desirable to include 25 wt% of cacao butter in the whole chocolate component to obtain good flavor and taste. The content of the chocolate component is 3–30 wt% in the whole emulsion of the present invention. If the content is below 3 wt%, the chocolate flavor of the emulsion is too weak, and if the content is over 30 wt%, the balance between the chocolate component and other components in the emulsion is destroyed and it is not possible to obtain a desired flavored product.

The enzyme-treated chocolate is obtained by adding enzyme (amylase) to 20–50% aqueous chocolate solution, stirring at 20°–90° C., preferably 40°–70° C., for 0.2–15 hours, and if necessary, removing water by adequate means.

As the suitable sugar component used in the present invention, there are, for example, sucrose (cane sugar), fructose (fruit sugar), maltose (malt sugar), dextrose (grape sugar), liquid sugar, glucose syrup (mizuame). The selection of the sugar component mainly depends on the selection of the chocolate component. The content of the sugar is 10–30 wt% in he whole emulsion of the present invention. If the content of the sugar component is below 10 wt%, the emulsion has a strong bitterness, it is not possible to obtain a mild flavored product, and if the content is over 30 wt%, the emulsion is overly sweet with insufficient foamability.

Sodium caseinate is effective to maintain the emulsion structure. The effect of sodium caseinate is exhibited in the range of 0.5–4 wt% in the whole emulsion of the present invention. If the content of sodium caseinate is below 0.5 wt%, the effect is not found, if the content is over 4 wt%, the flavor of sodium caseinate harms the flavor of the chocolate.

As the defatted milk solid used in the present invention, there are, for example, milk, defatted milk, skim milk powder, whey powder, or soybean protein. The content of the defatted milk solid is 2–6 wt% in the whole emulsion of the present invention. If the content of the defatted milk solid is below 2 wt%, the effect of the defatted milk solid is insufficient, and if the content is over 6 wt%, the emulsion has too strong of a milk flavor. The range (2–6 wt%) of the defatted milk solid in the whole emulsion emphasises the flavor of chocolate.

As the emulsifier used in the present invention, there are, for example, lecithin, monoglyceride, sorbitan fatty acid ester, propylene glycol fatty acid ester, sugar fatty acid ester, polyglycerol fatty acid ester, polyoxyethylene fatty acid ester, polyoxyethylene sorbitan fatty acid ester, glycerol or polyglycerol condensed fatty acid ester. It is preferred to use the combination of a hydrophilic emulsifier and a lipophilic emulsifier, particularly preferred is the combination of lecithin and monoglyceride and a third emulsifier(s) which is one or more selected from the group comprising sugar fatty acid ester, polyoxyethylene fatty acid ester, polyoxyethylene sorbitan fatty acid ester, and polyglycerol fatty acid ester. The content of the emulsifier should be 3–10 wt% based on the oil of the present invention. If the content of the emulsifier is below 3 wt% as conventional, there is obtained an unfoamable emulsion or a low foamable emulsion which has plasticity so as not to obtain a topping satisfactory in durability. If the content is over 10 wt%, the emulsion has a high viscosity and causes plasticization. The more preferable content of the emulsifier is 6–7 wt% based on the oil of the present invention.

In the present invention, 0.05–3 wt% of stabilizer is added. As the suitable stabilizer, there are, for example, locust bean gum, carrageenan, gelatin, crystalline cellulose, xanthen gum. Especially, crystalline cellulose is preferable for its palatable taste.

In the present invention, 0.02–0.1 wt% of phosphoric acid salts is added. As the suitable phosphoric acid salts, there are, for example, sodium polyphosphate, sodium metaphosphate, sodium orthophosphate, sodium pyrophosphate, or the combination of them. Especially, sodium tripolyphosphate, sodium hexametaphosphate, trisodium orthophosphate are preferable.

In production of the emulsion of the present invention, these components are emulsified under conventional oil-in-water emulsion preparing conditions. At this time, the content of all solid components in the whole emulsion is 40–60 wt%. This content gives a long term stable emulsion in which no oil-up or creaming-up occurs.

The resulting emulsion is subjected to the process of sterilizing by heating at ultra high temperature (UHT sterilizing process). The UHT sterilizing process is able to carry out by means of commercial UHT sterilizing equipments. As the suitable indirect heating type UHT sterilizing equipments, there are, for example, APV Ultramatic UHT Treatment System (The A.P.V. Company LTD), Thermutator UHT System (Cherry Burrell), Sterideal UHT System (Stork), Contherm Scraped-Surface Heat Exchange System (ALFA-LAVAL), and as the suitable direct heating type UHT sterilizing equipments, there are, for example, APV Uperisation Continuous Sterilization System (The A.P.V. Company LTD), VTIS Sterilizing plant (ALFA-LAVAL), Laguiharre UHT System (Laguiharre), Pararisator UHT System (Paash Silkeborg), Vac-Heat UHT System (Crepaco).

The preferable embodiment of the present invention is as follows.

The oil phase is obtained by adding a lipophilic emulsifier to the oil which comprises at least 40 wt% lauric acid type oil that has a rising melting point of 30°–38° C. and including 5–30% saturated or unsaturated fatty acid that has more than 20 carbon atoms in the whole structured fatty acid, and solubilizing by heating.

An aqueous phase is obtained by adding and dissolving the hydrophilic emulsifier, the chocolate component, the sodium caseinate, the defatted milk solid, the sugar component, the phosphoric acid salts, and the stabilizer at the above-mentioned ratio to water.

15–35 weight parts of the oil phase and 85–65 weight parts of the aqueous phase are mixed in the mixing chamber at 30°–70° C. to obtain an oil-in-water preemulsion.

The resulting pre-emulsion is homogenized in the homogenizer to obtain an oil-in-water emulsion. Various types type of homogenizers such as high-pressure homogenizer, centrifuge homogenizer, ultrasonic homogenizer can be used in the present invention. Especially, a preferable homogenizer in the invention is a high-pressure homogenizer. In the case of using a high-pressure homogenization, the homogenization pressure is important. In the present invention, the preferable pressure is about 50–100 kg/cm$^2$.

The resulting homogenized emulsion is sterilized in UHT sterilizing equipment, again homogenized under the pressure 10–50 kg/cm$^2$, cooled to about 5° C., and packed into proper containers such as "tetra pack" containers under the condition without bacteria to obtain the emulsion product of the present invention.

The bacteria-free foamable oil-in-water emulsion of the present invention can be widely used as chocolate materials for various purposes, namely for kneading as it is, for nappe on whipping, for topping on whipping and plasticising, and for filling. The softness of the product can be controlled without changing the chocolate ratio. In the process of the present invention, it is unnecessary to boil cream. Since the product of the present invention is bacteria-free, it can be used in any cases sanitarily. The whipped bacteria-free foamable oil-in-water emulsion of the present invention has no cracks for 3-5 days after nappe and topping on fancy cakes and after being left at 15° C., or after nappe and topping on fancy cakes and freezing at -25° C. for 2-4 weeks and melting at 10° C. and being left at 15° C. On the contrary the conventional products have cracks after 1 day under the same conditions. The emulsion products of the present invention have long storage life and commercially high-value.

The present invention is further illustrated by the following examples.

EXAMPLE 1

The mixed oil was prepared by mixing 10.0 weight parts of hardened coconut oil having 35° C. rising melting point and 10.0 weight parts of hardened soybean oil having 34° C. rising melting point and melting it at 70° C.

The oil phase was prepared by adding and dissolving 0.1 weight part of monoglyceride having iodine value 20, 0.2 weight part of propylene glycol fatty acid ester, 0.3 weight part of lecithin and 0.3 weight part of sorbitan monooleate to the mixed oil.

The aqueous phase was prepared by adding and dissolving 0.3 weight part of sugar fatty acid ester (HLB 11), 2 weight parts of defatted skim milk powder, 3 weight parts of sodium caseinate, 10 weight parts of chocolate component (including 3.5 weight parts of cacao mass and 1.5 weight parts of cacao powder), 20 weight parts of sucrose, 0.1 weight part of crystalline cellulose, and 0.05 weight part of trisodium orthophosphate to 47.65 weight parts of water.

The aqueous phase was heated to 40° C., and mixed with the oil phase. The mixture was agitated by the propeller agitator at about 50° C. for 10-15 minutes to obtain a pre-emulsion.

The resulting pre-emulsion was homogenized by a homogenizer at the pressure of 100 g/cm² to obtain an oil-in-water emulsion having 50 wt% of solid content.

The oil-in-water emulsion was maintained at about 50° C. and sterilized by VTIS sterilizing plant (ALFA LAVAL) at 140° C. for 2 seconds, and again homogenized by homogenizer, and cooled at about 5° C. to obtain the bacteria-free foamable oil-in-water emulsion of the present invention.

No oilup was found in the emulsion left for 2 months at 10° C. After leaving the emulsion for 2 months at 10° C., 500 ml of it was whipped by whipper. Whip was finished within 3 minutes. Overrun was 100%. The whipped emulsion had good durability and good flavor.

COMPARATIVE EXAMPLE 1

17 weight parts of raw cream (oil content 47%) and 48 weight parts of milk were mixed. 3.5 weight parts of cacao mass, 1.5 weight parts of cacao powder, and 20 weight parts of sugar were added to the cream-milk mixture at 60° C. The mixture was cooled to 5° C. After leaving the mixture for 24 hours at 10° C., 50 ml of it was whipped. But it was not plasticized. Leaving the mixture at 10° C., it rotted after 4 days.

COMPARATIVE EXAMPLE 2

With synthetic cream (oil content 47%; 2 wt% of emulsifier in the oil) instead of raw cream, comparative example 1 was repeated. The product was not plasticized.

EXAMPLE 2

The mixed oil was prepared by mixing 12.5 weight parts of hardened rapeseed oil having 35° C. rising melting point and 12.5 weight parts of hardened coconut oil having 32° C. rising melting point and melting it at 70° C.

The oil phase was prepared by adding and dissolving 0.1 weight part of monoglyceride having iodine value 20, 0.2 weight part of propylene glycol fatty acid ester, and 0.6 weight part of lecithin to the mixed oil.

The aqueous phase was prepared by adding and dissolving 0.3 weight part of sugar fatty acid ester (HLB 11), 3 weight parts of defatted skim milk powder, 0.5 weight part of sodium caseinate, 10 weight parts of chocolate component (including 3.5 weight parts of cacao mass and 1.5 weight parts of cacao powder), 15 weight parts of sucrose, 0.06 weight part of crystalline cellulose, and 0.05 weight part of trisodium orthophosphate to 50.15 weight parts of water.

The aqueous phase was heated to 40° C., and mixed with the oil phase. The mixture was agitated by the propeller agitator at about 50° C. for 10-15 minutes to obtain a pre-emulsion.

The resulting pre-emulsion was homogenized by a homogenizer at a pressure of 100 kg/cm² to obtain oil-in-water emulsion.

The oil-in-water emulsion was maintained at about 50° C. and sterilized by VTIS sterilizing plant (ALFA LAVAL) at 140° C. for 2 seconds, and again homogenized by a homogenizer, and cooled at about 5° C. to obtain the bacteria-free foamable oil-in-water emulsion of the present invention (Emulsion product No. 1).

This example is shown at No. 1 in the Table 1.

EXAMPLES 3-5

Using materials shown at No. 2-4 in Table 1, the emulsions of the present invention (Emulsion products No. 2-4) were obtained under the same conditions as in EXAMPLE 2.

The emulsion products No. 1-4 were aged for 20 hours in the refrigerator.

300 ml of each emulsion products No. 1-4 were whipped by the whipper. All of them were finished whipping within 3 minutes, and their over-run was 120%. Their standup quality, flavor and taste were excellent.

As shown in Table 2, on the fancy cakes (type 6) made of these emulsion products of the present invention and other cake materials, no cracks were found after leaving for 5 days at 15° C.

Other fancy cakes made of same materials were stored in the -25° C. freezer for 4 weeks, melted at 10° C. for 6 hours, and left at 15° C. for 4 days. As shown in Table 2, no cracks were found similar to the above non-freezing examples.

TABLE 1

| Example No. | Ex. 2 | Ex. 3 | Ex. 4 | Ex. 5 |
|---|---|---|---|---|
| Emulsion product No. | No. 1 | No. 2 | No. 3 | No. 4 |
| Oil composition (%) | | | | |
| hardened rapeseed oil (1) | 50 | | | 70 |
| hardened fish oil (2) | | 50 | 20 | |
| hardened coconut oil (3) | 50 | 50 | 80 | 30 |
| The ratio of fatty acid having more than 20 carbon atoms (%) | 20 | 15 | 6 | 28 |

TABLE 1-continued

| Example No. | Ex. 2 | Ex. 3 | Ex. 4 | Ex. 5 |
|---|---|---|---|---|
| Emulsion product No. | No. 1 | No. 2 | No. 3 | No. 4 |
| Emulsion composition (weight part) | | | | |
| oil phase | 25 | 20 | 39 | 15 |
| chocolate component | 10 | 20 | 5 | 30 |
| defatted milk solid | 3 | 2 | 2 | 4 |
| sodium caseinate | 0.5 | 1 | 2 | 3 |
| sugar | 15 | 15 | 10 | 15 |
| stabilizer (crystalline cellulose) | 0.06 | 0.1 | 0.5 | 1.0 |
| phosphoric acid salt | 0.05 | 0.07 | 0.03 | 0.05 |
| emulsifier (% based on oil) (4) | 5 | 7 | 3 | 10 |
| content of all solid components (%) | 54.9 | 60.0 | 59.7 | 49.6 |

NOTES
(1) rising melting point 35° C., ratio of fatty acid having more than 20 carbon atoms 40%
(2) rising melting point 36° C., ratio of fatty acid having more than 20 carbon atoms 30%
(3) rising melting point 32° C., ratio of fatty acid having more than 20 carbon atoms TRACE
(4) combination of sugar fatty acid ester (HLB 11, RYOTO Co. S-1170) and soybean lecithin (AJINOMOTO Co.) and glycerine mono fatty acid ester (RIKEN VITAMIN Co.) and propylene glycol fatty acid ester (RIKEN VITAMIN Co.)

TABLE 2

| | Cracks on leaving at 15° C. | | | | | | | | | |
|---|---|---|---|---|---|---|---|---|---|---|
| | After whipping nape | | | | | After whipping nappe and freezing (1) | | | | |
| (days) | 1 | 2 | 3 | 4 | 5 | 1 | 2 | 3 | 4 | 5 |
| Ex. 2 No. 1 | − | − | − | − | ± | − | − | − | ± | + |
| Ex. 3 No. 2 | − | − | − | − | − | − | − | − | ± | + |
| Ex. 4 No. 3 | − | − | − | − | ± | − | − | − | ± | + |
| Ex. 5 No. 4 | − | − | − | − | ± | − | − | − | − | ± |

NOTES
(1) freezing at −25° C. for 4 weeks, melting at 10° C. for 6 hours, leaving at 15° C.

ESTIMATION
- − excellent (no cracks)     product value was not lost
- ± good
- + average
- ++ bad     product value was lost
- +++ poor (cracks on whole surface)

EXAMPLES 6-9

An oil phase was prepared by melting at 70° C. 25 weight parts of hardened cotton seed oil having a rising melting point 35° C., and adding 0.4 weight part of glycerinefatty acid ester (iodine value 20), and 0.4 weight part of lecithin.

An enzyme treated cacao mass was prepared by adding α-amylase (SPITASE cp-1 NAGASE SANGYO) at a rate of 10 DUN to 1 g of cacao mass, stirring for 2 hours at 65° C., and removing water by freeze-drying.

An aqueous phase was prepared by adding and dissolving 0.4 weight part of sugar fatty acid ester (HLB 11), 3 weight parts of skim milk powder, 0.6 weight part of sodium caseinate, 15 weight parts of enzymetreated cacao mass, 20 weight parts of sucrose, 0.1 weight part of crystalline cellulose, and 0.1 weight part of sodium hexametaphosphate to 40 weight parts of water. The aqueous phase was heated to 40° C., and mixed with the oil phase. The mixture was agitated by the propeller agitator at about 50° C. for 10-15 minutes to obtain a pre-emulsion. The resulting pre-emulsion was homogenized by a homogenizer at a pressure of 100 kg/cm² to obtain an oil-in-water emulsion. The oil-in-water emulsion was maintained at about 50° C. and sterilized by VTIS sterilizing plant (ALFA LAVAL) at 140° C. for 2 seconds, and again homogenized by a homogenizer, and cooled at about 5° C. to obtain the bacteria-free foamable oil-in-water emulsion of the present invention (emulsion product No. 5 in Table 3).

Emulsion products No. 6-8 which have various emulsion components were prepared by using the same operation conditions as emulsion product No. 5 (in Table 3).

Emulsion products No. 5-8 were aged in the refrigerator for 20 hours.

Tests results of emulsion products No. 5-8 are shown in Table 4.

The viscocity of emulsion products No. 5-8 did not rise after 3 months leaving at 5° C.

500 ml of each emulsion products No. 5-8 was whipped by whipper. Every whipped product had good foamability. Fancy cakes having 18 cm diameter were made of such whipped products and other cake materials. After leaving cakes at 15° C. for 5 days, no cracks were found, and their colour, flavor, and shape did not change. After freezing the cake at −25° C. for 2 weeks, then melting them at 10° C. for 6 hours, and leaving them at 15° C. for 3 days, the state of cakes was good as first.

TABLE 3

| Example No. | Ex. 6 | Ex. 7 | Ex. 8 | Ex. 9 |
|---|---|---|---|---|
| Emulsion product No. | No. 5 | No. 6 | No. 7 | No. 8 |
| Oil composition | | | | |
| hardened cotton seed oil (1) | 25 | | 15 | 15 |
| hardened coconut oil (2) | | 25 | 15 | |
| Chocolate component | | | | |
| α-amylase treated cacao mass (3) | 15 | | | |
| β-amylase treated cacao powder (4) | | 10 | | |
| gluco-amylase treated cacao powder (5) | | | 5 | |
| α-amylase, β-amylase treated sweet chocolate (6) | | | | 30 |
| Sodium caseinate | 0.6 | 0.6 | 2 | 1 |
| Defatted milk solid | | | | |
| defatted skim milk powder | 3 | | 4 | |
| soybean protein | | 2 | | 1 |
| Sugar components | | | | |
| sucrose | 15 | 8 | | 20 |
| fructose | | 8 | 15 | |
| Emulsifier | | | | |
| lecithin | 0.4 | 1 | 0.2 | 0.6 |
| glycerine fatty acid ester (Iodine value 20) | 0.4 | 0.5 | 0.3 | 0.7 |
| sugar fatty acid ester (HLB 11) | 0.4 | 0.2 | 0.4 | |
| polyoxyethylene (8) stearate (HLB 11) | | | 0.2 | |
| polyglycerine fatty acid ester (HLB 10.5) | | 0.3 | | 0.2 |
| Crystalline cellulose | 0.1 | 0.1 | 0.1 | 0.05 |
| Sodium hexametaphosphate | 0.1 | 0.1 | 0.05 | 0.2 |
| content of all solid components | 60.0 | 55.8 | 58.4 | 51.6 |

NOTES
(1) rising melting point 35° C.
(2) rising melting point 32° C.
(3) This enzyme-treated chocolate was prepared by adding α-amylase (spitase cp-1 NAGASE SANGYO) to 20% cacao mass aqueous solution (oil content 53%) at the rate of 10 DUN of α-amylase to 1 g of cacao mass, stirring at 65° C. for 2 hours, then removing water by freeze-drying.
(4) This enzyme-treated chocolate was prepared by adding β-amylase (maltozyme 206 NAGASE SANGYO) to 30% cacao powder aqueous solution (oil content 23%) at the rate of 20 AUN of β-amylase to 1 g of cacao powder, stirring at 60° C. for 15 hours, then drying by heated air.
(5) This enzyme-treated chocolate was prepared by adding glucoamylase (glucozyme AMANO SEIYAKU) to 30% cacao powder aqueous solution (oil content 23%) at the rate of 6 U of glucoamylase to 1 g of cacao powder, stirring at 55° C. for 8 hours, then removing water by freeze-drying.
(6) This enzyme-treated chocolate was prepared by adding α-amylase (spitase cp-1 NAGASE SANGYO) and β-amylase (maltozyme 206 NAGASE SANGYO) to 40% sweet chocolate aqueous solution (oil content 26.5%) at the rate of 5 DUN of α-amylase and 15 AUN of β-amylase to 1 g of sweet chocolate, stirring at 60° C. for 10 hours.

TABLE 4

| Example No. | Ex. 6 | Ex. 7 | Ex. 8 | Ex. 9 |
|---|---|---|---|---|
| Emulsion product No. | No. 5 | No. 6 | No. 7 | No. 8 |
| viscosity (new product) (cps) | 80 | 70 | 45 | 100 |
| whipping | A | A | A | A |
| viscosity (after 3 months at 5° C.) (cps) | 90 | 90 | 60 | 120 |
| (new product) | | | | |
| coating property | A | B | B | A |
| standup quality | A | A | A | A |
| colour | A | A | A | A |
| flavor | A | A | A | A |
| (after 5 days at 15° C.) | | | | |
| standup quality | A | A | A | B |
| colour | A | A | A | A |
| flavor | A | A | A | A |
| cracks | A | A | A | B |
| (after freezing and melting) | | | | |
| standup quality | A | A | A | B |
| colour | A | A | A | A |
| flavor | A | A | A | A |
| cracks | A | A | A | A |
| UTILITY | A | A | A | A |

A: good  B: average  C: bad  S: solid

What is claimed is:

1. A process for making a creamy, bacteria-free, foamable oil-in-water chocolate emulsion comprising:
   (a) emulsifying an aqueous phase containing a hydrophilic emulsifier and 3-30 wt. % of a chocolate component based on the weight of the emulsion with an oil phase containing a lipophilic emulsifier and 15-35 wt. % of oil based on the weight of the emulsion, wherein the total of all solid components in the resulting emulsion is from 40 to 60 wt. %;
   (b) homogenizing said resulting emulsion by high pressure homogenization at a pressure of about 50-100 Kg/cm$^2$ and
   (c) sterilizing said homogenized resulting emulsion by heating at ultra-high temperature.

2. The process according to claim 1, wherein said oil is a mixed oil containing a lauric acid-type oil having a 30°-38° C. melting point.

3. The process according to claim 2, wherein said mixed oil includes at least 20 wt% of a lauric acid-type oil.

4. The process according to claim 2, wherein said mixed oil includes at least 40 wt% of a lauric acid-type oil.

5. The process according to claim 3, wherein said mixed oil is an oil including 5-30 wt% of a saturated or unsaturated fatty acid having more than 20 carbon atoms.

6. The process according to claim 1, wherein said chocolate component is an enzyme-treated chocolate.

7. The process according to claim 4, wherein said mixed oil is an oil including 5-30 wt% of a saturated or unsaturated fatty acid having more than 20 carbon atoms.

8. The process according to claim 2, wherein said chocolate component is an enzyme-treated chocolate.

9. A process for making a creamy bacteria-free, foamable oil-in-water chocolate emulsion comprising:
   (a) combining a lipophilic emulsifier with an oil comprising at least 20 wt% of a lauric acid-type oil to produce an oil phase;
   (b) combining a hydrophilic emulsifier, 3-30 wt.% of a chocolate component based on the weight of the emulsion, sodium caseinate, defatted milk solid, a sugar component, phosphoric acid salts, and a stabilizer to water to produce an aqueous phase;
   (c) mixing 15 to 35 wt% of said oil phase and 85 to 65 wt% of said aqueous phase to produce a pre-emulsion;
   (d) homogenizing said pre-emulsion by high-pressure homogenization at a pressure of about 50-100 kg/cm$^2$; and
   (e) sterilizing the resulting homogenized emulsion by heating at ultra-high temperature.

10. The process according to claim 9, wherein said oil is a mixed oil comprising a lauric acid-type oil having a 30°-38° C. melting point.

11. The process according to claim 9, wherein said lauric acid-type oil is a member selected from the group consisting of coconut oil, palm kernal oil and hardened, fractionated and ester-exchanged oils thereof.

12. The process according to claim 11, wherein said oil is a mixed oil comprising a lauric acid-type oil having a 30°-38° C. melting point.

13. The process according to claim 12, wherein said mixed oil contains at least 40 wt% of said lauric acid-type oil.

14. The process according to claim 10, wherein said mixed oil contains 5-30 wt% of a saturated or unsaturated fatty acid having more than 20 carbon atoms.

15. The process according to claim 9, wherein said chocolate component is a chocolate treated with amylase.

16. The process according to claim 9, wherein said pre-emulsion contains:
   10-30 wt% of said sugar component;
   0.5 to 4 wt% of said sodium caseinate;
   2.6 wt% of said defatted milk solid;
   3-10 wt% of emulsifier based on the content of said oil;
   0.05-3 wt% of said stabilizer; and
   0.02-0.1 wt% of said phosphoric acid salts, wherein said weight percentages are based on the weight of the emulsion.

17. A process for making a creamy, bacteria-free, foamable oil-in-water chocolate emulsion comprising:
   (a) emulsifying an aqueous phase containing a hydrophilic emulsifier and 3-30 wt% of a chocolate component based on the weight of the emulsion with an oil phase containing a lipophilic emulsifier and 15-35 wt% of an oil based on the weight of the emulsion, said oil comprising at least 20 wt% of a lauric acid-type oil having a 30°-38° C. melting point, and wherein the total of all solid components in the resulting emulsion is from 40 to 60 wt%;
   (b) homogenizing said resulting emulsion by high pressure homogenization at a pressure of about 50-100 kg/cm$^2$ and
   (c) sterilizing said homogenized resulting emulsion by heating at an ultra-high temperature.

18. The process according to claim 17, wherein said emulsion further contains emulsifier, a sugar component, defatted milk solid, and a stabilizer.

19. The creamy, bacteria-free foamable oil-in-water chocolate emulsion prepared by the process according to claim 17.

* * * * *